US012718830B2

(12) United States Patent
Liu et al.

(10) Patent No.: US 12,718,830 B2
(45) Date of Patent: Aug. 25, 2026

(54) WEARABLE DEVICE WITH SPEECH ENHANCEMENT

(71) Applicant: BOSE CORPORATION, Framingham, MA (US)

(72) Inventors: Yang Liu, Boston, MA (US); Henry Gunawan, Cambridge, MA (US); Brandon Lee Olmos, Brookline, MA (US); Lei Cheng, Wellesley, MA (US); Marko Stamenovic, Truro, MA (US); Mikolaj Aleksander Kegler, London (GB); Benjamin Isaac Raubvogel, Thornhill (CA); Douglas George Morton, Southborough, MA (US)

(73) Assignee: Bose Corporation, Framingham, MA (US)

( * ) Notice: Subject to any disclaimer, the term of this patent is extended or adjusted under 35 U.S.C. 154(b) by 160 days.

(21) Appl. No.: 18/665,439

(22) Filed: May 15, 2024

(65) Prior Publication Data

US 2025/0356870 A1 Nov. 20, 2025

(51) Int. Cl.
*H04B 3/20* (2006.01)
*G10L 21/0208* (2013.01)
*G10K 11/16* (2006.01)

(52) U.S. Cl.
CPC *G10L 21/0208* (2013.01); *G10L 2021/02082* (2013.01)

(58) Field of Classification Search
CPC .................. G10L 21/0208; G10L 2021/02082
USPC .................................................. 381/66, 71.1
See application file for complete search history.

(56) References Cited

U.S. PATENT DOCUMENTS

| | | | | |
|---|---|---|---|---|
| 11,330,358 | B2 | 5/2022 | Ganeshkumar | |
| 11,533,555 | B1 | 12/2022 | Ganeshkumar | |
| 2022/0310107 | A1* | 9/2022 | Liu | G10L 25/51 |
| 2024/0071404 | A1 | 2/2024 | Morton et al. | |
| 2024/0334125 | A1* | 10/2024 | Alves | H04R 1/1083 |
| 2025/0088786 | A1* | 3/2025 | Woelfl | H04R 1/2857 |

OTHER PUBLICATIONS

International Search Report and Written Opinion dated Sep. 9, 2025 for Application No. PCT/US2025/029170.

* cited by examiner

*Primary Examiner* — Ammar T Hamid
(74) *Attorney, Agent, or Firm* — Patterson + Sheridan, LLP

(57) ABSTRACT

Techniques, including devices and systems implementing the techniques, for using speech enhancement to provide optimal denoised output. One example system generally includes a device of a user, a first sensor coupled to the device, a second sensor coupled to the device, and one or more processors coupled to the device. The one or more processors are generally, individually or collectively, configured to receive, at the first sensor, a first audio signal, receive, at the second sensor, a second audio signal, determine a minimum variance distortionless response (MVDR) using at least the second audio signal, and determine a mixed audio signal using a condition of an environment of the device and at least one of the first audio signal, the second audio signal, or the MVDR.

20 Claims, 7 Drawing Sheets

WEARABLE DEVICE WITH SPEECH ENHANCEMENT

FIELD

Aspects of the disclosure generally relate to wearable devices, and, more particularly, to techniques to enable a wearable device to provide improved output audio by utilizing speech enhancement.

BACKGROUND

Wearable devices such as headphones commonly provide for two way communication, in which the device can both capture audio that may include user speech and output audio that includes the user speech to other devices. To capture user speech, the device may use one or more microphones located somewhere on the device. However, background noise may also be present in the captured audio. For example, the microphones used to capture user speech may also capture background noise that may include speech from other speakers (e.g., other people speaking near the user), as well as other unwanted non-speech noise (e.g., sneezing, crying, laughing, or other ambient noise present in the environment surrounding the device). As a result of the presence of background noise in the captured audio, the wearable device may produce suboptimal output audio.

Accordingly, methods for providing improved output audio, as well as apparatuses and systems configured to implement these methods, are desired.

SUMMARY

All examples and features mentioned below can be combined in any technically possible way.

Aspects of the present disclosure provide a system. The system includes a device of a user; a first sensor coupled to the device; a second sensor coupled to the device; and one or more processors coupled to the device. The one or more processors, individually or collectively, are configured to receive, at the first sensor, a first audio signal; receive, at the second sensor, a second audio signal; determine a minimum variance distortionless response (MVDR) using at least the second audio signal; and determine a mixed audio signal using a condition of an environment of the device and at least one of the first audio signal, the second audio signal, or the MVDR.

In aspects, the one or more processors, individually or collectively, are further configured to: determine an output audio signal using the mixed audio signal and a trained machine-learning model configured to at least partially denoise the mixed audio signal.

In aspects, the one or more processors, individually or collectively, are further configured to: modify the first audio signal using a static acoustic echo canceller (AEC); and further modify the first audio signal using an adaptive AEC.

In aspects, the one or more processors, individually or collectively, are further configured to: receive, at a third sensor coupled to the device, a third audio signal, and where determining the MVDR comprises using the second audio signal and the third audio signal.

In aspects, the one or more processors, individually or collectively, are further configured to: determine that the condition of the environment of the device is windy when an energy of the MVDR is greater than an energy of the second audio signal by a wind factor; and determine that the condition of the environment of the device is not windy when the energy of the MVDR is less than the energy of the second audio signal by the wind factor, where determine the mixed audio signal when the condition is windy comprises using the first audio signal and the second audio signal for frequencies below a first frequency threshold and the MVDR for frequencies above the first frequency threshold.

In aspects, the one or more processors, individually or collectively, are further configured to: when the condition of the environment of the device is not windy, determining that the condition is quiet when a level of a noise of the third audio signal is below a tunable noise threshold, where when the condition is quiet, determining the mixed audio signal using the MVDR for a range of frequencies; and when the condition of the environment of the device is not windy, determining that the condition is noisy when the level of the noise of the third audio signal is above the tunable noise threshold, where when the condition is noisy, determining the mixed audio signal using the MVDR and the first audio signal for frequencies below a second frequency threshold and the MVDR for frequencies above the second frequency threshold.

Aspects of the present disclosure are directed to a method for audio signal processing in a device. The method for audio signal processing in a device includes receiving, at a first sensor coupled to the device, a first audio signal; receiving, at a second sensor coupled to the device, a second audio signal; determining a minimum variance distortionless response (MVDR) using at least the second audio signal; and determining a mixed audio signal using a condition of an environment of the device and at least one of the first audio signal, the second audio signal, or the MVDR.

In aspects, the method further includes determining an output audio signal using the mixed audio signal and a trained machine-learning model configured to at least partially denoise the mixed audio signal.

In aspects, the method further includes modifying the first audio signal using a static acoustic echo canceller (AEC); and further modifying the first audio signal using an adaptive AEC.

In aspects, the method further includes receiving, at a third sensor coupled to the device, a third audio signal, and where determining the MVDR comprises using the second audio signal and the third audio signal.

In aspects, the method further includes determining that the condition of the environment of the device is windy when an energy of the MVDR is greater than an energy of the second audio signal by a wind factor; and determining that the condition of the environment of the device is not windy when the energy of the MVDR is less than the energy of the second audio signal by the wind factor, where determining the mixed audio signal when the condition is windy comprises using the first audio signal and the second audio signal for frequencies below a first frequency threshold and the MVDR for frequencies above the first frequency threshold.

In aspects, the method further includes when the condition of the environment of the device is not windy, determining that the condition is quiet when a level of a noise of the third audio signal is below a tunable noise threshold, where when the condition is quiet, determining the mixed audio signal using the MVDR for a range of frequencies; and when the condition of the environment of the device is not windy, determining that the condition is noisy when the level of the noise of the third audio signal is above the tunable noise threshold, where when the condition is noisy, determining the mixed audio signal using the MVDR and the first audio signal for frequencies below a second frequency threshold and the MVDR for frequencies above the second frequency threshold.

In aspects, determining the mixed audio signal when the condition is windy comprises: dynamically mixing a magnitude of the first audio signal and a magnitude of the second audio signal for the frequencies below the first frequency threshold, where a ratio of the mixing between the magnitude of the first audio signal and the magnitude of the second audio signal for each frequency bin of the frequencies below the first frequency threshold is based on a ratio between an energy of the first audio signal and the energy of the second audio signal; using a phase of the first audio signal for the frequencies below the first frequency threshold; and using a magnitude and a phase of the MVDR for the frequencies above the first frequency threshold.

In aspects, determining the mixed audio signal when the condition is noisy comprises: dynamically mixing a magnitude of the first audio signal and a magnitude of the MVDR for the frequencies below the second frequency threshold, where a ratio of the mixing between the magnitude of the first audio signal and the magnitude of the MVDR for each frequency bin of the frequencies below the second frequency threshold is based on a ratio between an energy of the first audio signal and the energy of the MVDR; using a phase of the first audio signal for the frequencies below the second frequency threshold; and using a magnitude and a phase of the MVDR for the frequencies above the second frequency threshold.

In aspects, the first sensor comprises an internal microphone inside or facing an ear canal of a user of the device or a voice band accelerometer outside the ear canal; the second sensor comprises a first microphone outside the ear canal; and the third sensor comprises a second microphone outside the ear canal.

In aspects, the device comprises a wearable device.

Aspects of the present disclosure a non-transitory computer-readable medium comprising computer-executable instructions that, when executed by one or more processors of a device, cause the device to perform a method for audio signal processing, the method comprising: receiving, at a first sensor coupled to the device, a first audio signal; receiving, at a second sensor coupled to the device, a second audio signal; determining a minimum variance distortionless response (MVDR) using at least the second audio signal; and determining a mixed audio signal using a condition of an environment of the device and at least one of the first audio signal, the second audio signal, or the MVDR.

In aspects, the method further comprises: determining an output audio signal using the mixed audio signal and a trained machine-learning model configured to at least partially denoise the mixed audio signal.

In aspects, the method further comprises: modifying the first audio signal using a static acoustic echo canceller (AEC); and further modifying the first audio signal using an adaptive AEC.

In aspects, the method further comprises: receiving, at a third sensor coupled to the device, a third audio signal, and where determining the MVDR comprises using the second audio signal and the third audio signal.

Two or more features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

BRIEF DESCRIPTION OF THE DRAWINGS

Like numerals indicate like elements.

DETAILED DESCRIPTION

Figure 1:
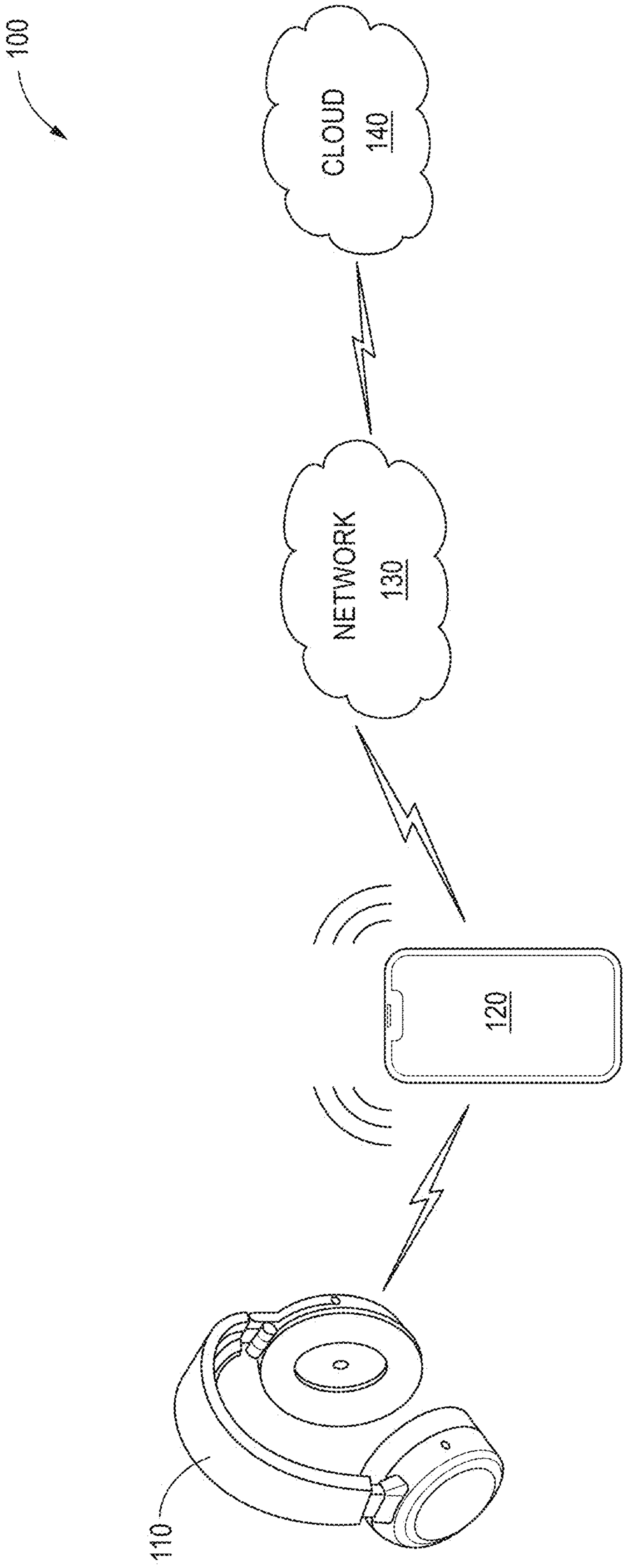
FIG. 1 illustrates an example system, in which aspects of the present disclosure may be implemented.

Certain aspects of the present disclosure provide techniques, including devices and systems implementing the techniques, for using speech enhancement to provide optimal denoised output. Such techniques may involve receiving (e.g., capturing) audio signals at two or more sensors included in a device. For example, one sensor may be implemented by an internal sensor (e.g., a bone conduction sensor and/or transducer) and one or more additional sensors may be implemented by one or more microphones located outside of the device (e.g., outside the ear canal of a user of the device). The audio signals received at the sensors may include speech (e.g., a speech component) from the user of the device. The device may be configured to determine a minimum variance distortionless response (MVDR) using the audio signals received at the sensor(s) outside the device, and dynamically determine a mixed audio signal using a condition of an environment of the device and at least one of the audio signal received at the internal sensor, an audio signal received at the sensors outside the device, or the MVDR. In certain aspects, the device may modify the audio signal received at the internal sensor using a static acoustic echo canceller (AEC) and an adaptive AEC configured to remove the signal contributed by an audio speaker (e.g., a transducer) of the device. In other aspects, the device may be configured to modify the audio signal received at the sensor(s) outside the device using an adaptive AEC. The device may be configured to use the mixed audio signal and a trained machine-learning model (e.g., denoiser) configured to at least partially denoise the mixed audio signal to determine an output audio signal that includes the speech of the user (e.g., for transmission to another device).

Many wearable devices may employ a denoising system configured to denoise an input audio signal (e.g., an audio signal received at one or more sensors of the wearable device) that includes speech originating from the user and provide a denoised output audio signal (e.g., an audio signal for transmission to another device) that includes the user speech. This type of denoising system may function admirably when the device is in a quiet environment. However, the denoising system may struggle when the device is in noisier environments (e.g., when a signal-to-noise ratio (SNR) of the received audio signals is relatively low, for example, between −10 dB and 2 dB, such as −6 dB, −3 dB, 1 dB, etc.). For example, when the environment of the device is windy (e.g., includes significant wind noise), and/or when the environment of the device is noisy (e.g., includes significant acoustic noise, such as when driving, in a restaurant, when using public transportation, etc.). The denoising system may struggle even more when both wind and environmental noise are present (e.g., when walking in a city street on a windy day). As a result, the intelligibility and naturalness of any output signal that includes the user speech may be impacted. This is especially problematic in the context of two way communication, where the wearable device should preferably capture audio that includes the user speech and output an audio signal that includes the user speech in an intelligible and natural form to one or more other devices.

The present disclosure may enable a wearable device to provide an optimal denoised output audio signal using speech enhancement. As a result of using the speech enhancement described herein, the device may be able to greatly reduce the presence of any wind noise and acoustic noise in the output audio signal while maintaining great user speech intelligibility and naturalness. For example, the speech enhancement may enable the device to provide clear user voice in an office environment by at least partially eliminating noise associated with a heating, ventilation, and air conditioning (HVAC) system and/or fan noise generated by desktop computers or laptops present in the office environment. The speech enhancement may function when the device is worn in a single user ear or both user ears, and during both device transparent and quiet modes.

An Example System

FIG. 1 illustrates an example system 100, in which aspects of the present disclosure may be implemented. As shown, system 100 includes one or more sound processing and playback devices 110 (e.g., a wireless audio device, such as a wearable device as shown in FIG. 1) communicatively coupled with a source device 120 (e.g., a computing device or user device, such as a smartphone, tablet, computer, television, or the like). Throughout the present disclosure, the sound processing and playback device 110 may be referred to simply as the wearable device 110. The wearable device 110 may be configured to be worn by a user and may be a headset that includes two or more speakers and two or more sensors, as illustrated in FIG. 1. The source device 120 is illustrated as a smartphone or a tablet computer wirelessly paired with the wearable device 110. At a high level, the wearable device 110 may play audio content transmitted from the source device 120. The user may use the graphical user interface (GUI) on the source device 120 to select the audio content and/or adjust settings of the wearable device 110. The wearable device 110 provides soundproofing, active noise cancellation, and/or other audio enhancement features to play the audio content transmitted from the source device 120.

In certain aspects, the wearable device 110 includes voice activity detection (VAD) circuitry capable of detecting the presence of speech signals (e.g., human speech signals) in a sound signal received by sensors (not illustrated) of the wearable device 110. For instance, the sensors of the wearable device 110 may be implemented as microphones and may receive ambient and external sounds in the vicinity of the wearable device 110, including speech uttered by the user. The sound signal received by the sensors may have the speech signal mixed in with other sounds in the vicinity of the wearable device 110. Using the VAD, the wearable device 110 may detect and extract the speech signal from the received sound signal. In certain aspects, the VAD circuitry may be used to detect and extract speech uttered by the user in order to facilitate a voice call, voice chat between the user and another person, or voice commands for a virtual personal assistant (VPA), such as a cloud based VPA. In some cases, detections or triggers can include self-VAD (only starting up when the user is speaking, regardless of whether others in the area are speaking), active transport (sounds captured from transportation systems), head gestures, buttons, computing device based triggers (e.g., pause/un-pause from the phone), changes with input audio level, and/or audible changes in environment, among others. The voice activity detection circuitry may run or assist running the speech enhancement disclosed herein.

In certain aspects, the wearable device 110 includes speaker identification circuitry capable of detecting an identity of a speaker to which a detected speech signal relates to. For example, the speaker identification circuitry may analyze one or more characteristics of a speech signal detected by the VAD circuitry and determine that the user of the wearable device 110 is the speaker. In certain aspects, the speaker identification circuitry may use any of the existing speaker recognition methods and related systems to perform the speaker recognition.

The wearable device 110 further includes hardware and circuitry including processor(s)/processing system and memory configured to implement one or more sound management capabilities or other capabilities including, but not limited to, noise canceling circuitry (not shown) and/or noise masking circuitry (not shown), body movement detecting devices/sensors and circuitry (e.g., one or more accelerometers, one or more gyroscopes, one or more magnetometers, etc.), geolocation circuitry and other sound processing circuitry. The noise cancelling circuitry is configured to reduce unwanted ambient sounds external to the wearable device 110 by using active noise cancelling (also known as active noise reduction). The sound masking circuitry is configured to reduce distractions by playing masking sounds via the speakers of the wearable device 110. The movement detecting circuitry is configured to use devices/sensors such as an accelerometer, gyroscope, magnetometer, or the like to detect whether the user wearing the wearable device 110 is moving (e.g., walking, running, in a moving mode of transport, etc.) or is at rest and/or the direction the user is looking or facing. The movement detecting circuitry may also be configured to detect a head position of the user for use in determining an event, as will be described herein, as well as in augmented reality (AR) applications where an AR sound is played back based on a direction of gaze of the user.

In certain aspects, the wearable device 110 is wirelessly connected to the source device 120 using one or more wireless communication methods including, but not limited to, Bluetooth, Wi-Fi, Bluetooth Low Energy (BLE), other radio frequency (RF) based techniques, or the like. In certain aspects, the wearable device 110 includes a transceiver that transmits and receives data via one or more antennae in order to exchange audio data and other information with the source device 120.

In certain aspects, the wearable device 110 includes communication circuitry capable of transmitting and receiving audio data and other information from the source device 120. The wearable device 110 also includes an incoming audio buffer, such as a render buffer, that buffers at least a portion of an incoming audio signal (e.g., audio packets) in order to allow time for retransmissions of any missed or dropped data packets from the source device 120. For example, when the wearable device 110 receives Bluetooth transmissions from the source device 120, the communication circuitry typically buffers at least a portion of the incoming audio data in the render buffer before the audio is actually rendered and output as audio to at least one of the transducers (e.g., audio speakers) of the wearable device 110. This is done to ensure that even if there are RF collisions that cause audio packets to be lost during transmission, there is time for the lost audio packets to be retransmitted by the source device 120 before the lost audio packets have been rendered by the wearable device 110 for output by one or more acoustic transducers of the wearable device 110.

The wearable device 110 is illustrated as over-the-head headphones; however, the techniques described herein apply to other wearable devices, such as wearable audio devices, including any audio output device that fits around, on, in, or near an ear (including open-ear audio devices worn on the head or shoulders of a user) or other body parts of a user, such as head or neck. The wearable device 110 may take any form, wearable or otherwise, including standalone devices (including automobile speaker system), stationary devices (including portable devices, such as battery powered portable speakers), headphones (including over-ear headphones, on-ear headphones, in-ear headphones), earphones, earpieces, headsets (including virtual reality (VR) headsets and AR headsets), goggles, headbands, earbuds, armbands, sport headphones, neckbands, hearing aids, or eyeglasses. In certain aspects, the wearable device 110 may be implemented as a banded headset with two cups each configured to deliver audio output.

In certain aspects, the wearable device 110 is connected to the source device 120 using a wired connection, with or without a corresponding wireless connection. The source device 120 may be a smartphone, a tablet computer, a laptop computer, a digital camera, or other computing device that connects with the wearable device 110. As shown, the source device 120 can be connected to a network 130 (e.g., the Internet) and may access one or more services over the network. As shown, these services can include one or more cloud services 140.

In certain aspects, the source device 120 can access a cloud server in the cloud 140 over the network 130 using a mobile web browser or a local software application or "app" executed on the source device 120. In certain aspects, the software application or "app" is a local application that is installed and runs locally on the source device 120. In certain aspects, a cloud server accessible on the cloud 140 includes one or more cloud applications that are run on the cloud server. The cloud application may be accessed and run by the source device 120. For example, the cloud application can generate web pages that are rendered by the mobile web browser on the source device 120. In certain aspects, a mobile software application installed on the source device 120 or a cloud application installed on a cloud server, individually or in combination, may be used to implement the techniques for low latency Bluetooth communication between the source device 120 and the wearable device 110 in accordance with aspects of the present disclosure. In certain aspects, examples of the local software application and the cloud application include a gaming application, an audio AR or VR application, and/or a gaming application with audio AR or VR capabilities. The source device 120 may receive signals (e.g., data and controls) from the wearable device 110 and send signals to the wearable device 110.

An Example Wearable Device

Figure 2:
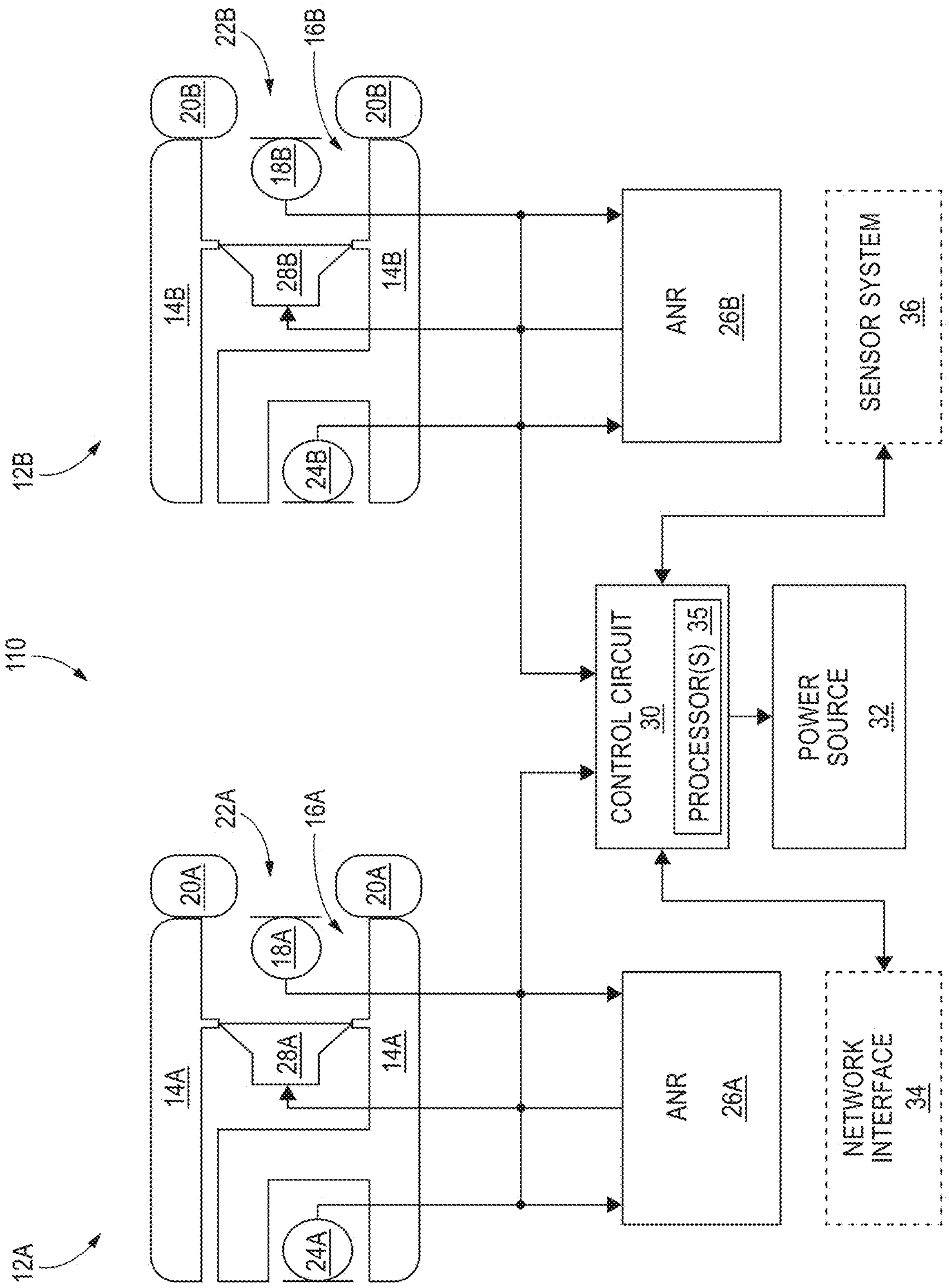
FIG. 2 illustrates an exemplary wireless audio device, in which aspects of the present disclosure may be implemented.

FIG. 2 illustrates an exemplary wearable device 110 and some of its components, in which aspects of the present disclosure may be implemented. Other components may be inherent in the wearable device 110 and not shown in FIG. 2. As shown, the wearable device 110 includes two earpieces 12A and 12B, each configured to direct sound towards an ear of the user. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal sensors (e.g., inner microphone(s)) 18 may be disposed within cavity 16. In implementations where the wearable device 110 is ear-mountable, an ear coupling 20 (e.g., an ear tip or ear cushion) may be attached to the casing 14 and surround an opening to the cavity 16. A passage 22 is formed through the ear coupling 20 and communicates with the opening to the cavity 16. In some examples, one or more outer sensors 24 are disposed on the casing in a manner that permits acoustic coupling to the environment external to the casing. The inner sensor(s) 18 and the outer sensor(s) 24 may each be implemented and/or referred to as a microphone, an accelerometer, and/or an inertial measurement unit (IMU).

In implementations that include active noise reduction (ANR) (which may include active noise cancellation (ANC) or controllable noise canceling (CNC)), the inner sensor(s) 18 may be an internal microphone(s) or feedback microphone(s) and the outer sensor(s) 24 may be feedforward microphone(s). In such implementations, each earpiece 12 includes an ANR circuit 26 that is in communication with the inner and outer sensors 18 and 24. The ANR circuit 26 receives an inner signal generated by the inner sensor(s) 18 and an outer signal generated by the outer sensor(s) 24 and performs an ANR process for the corresponding earpiece 12. The process includes providing a signal to an electroacoustic transducer 28 (e.g., speaker) disposed in the cavity 16 to generate an anti-noise acoustic signal that reduces or substantially prevents sound from one or more acoustic noise sources that are external to the earpiece 12 from being heard by the user. In addition to providing an anti-noise acoustic signal, the electroacoustic transducer 28 may utilize its sound-radiating surface for providing an audio output for playback (e.g., for a continuous audio feed).

In certain aspects, the wearable device 110 may also include a control circuit 30. The control circuit 30 is in communication with the inner sensor(s) 18, outer sensor(s) 24, and electroacoustic transducers 28, and receives the inner and/or outer microphone signals. In some cases, the control circuit 30 includes one or more microcontroller(s) or processor(s) 35, including for example, a digital signal processor (DSP) and/or an advanced reduced instruction set computer (RISC) machine (ARM) chip. In some cases, the microcontroller(s)/processor(s) (or simply, processor(s)) 35 may include multiple chipsets for performing distinct functions. For example, the processor(s) 35 may include a DSP chip for performing music and voice related functions, and a co-processor such as an ARM chip (or chipset) for performing sensor related functions.

The control circuit 30 may also include analog to digital converters for converting the inner signals from the two inner sensors 18 and/or the outer signals from the two outer sensors 24 to digital format. In response to the received inner and/or outer microphone signals, the control circuit 30 (including processor(s) 35) may take various actions. For example, audio playback may be initiated, paused, or resumed, a notification to a user (e.g., wearer) may be provided or altered, and a device (e.g., a cellular phone, a handheld device, a wireless device, a laptop computer, a tablet, a smartphone, an Internet of things (IoT) device, a wearable device, an AR device, a VR device, etc.) in communication with the wearable device 110 may be controlled. The wearable device 110 may also include a power source 32. The control circuit 30 and power source 32 may be in one or both of the earpieces 12 or may be in a separate housing in communication with the earpieces 12. The wearable device 110 may also include a network interface 34 to provide communication between the wearable device 110 and one or more audio sources or other personal audio devices (e.g., source device 120 as illustrated in FIG. 1). The network interface 34 may be wired (e.g., Ethernet) or wireless (e.g., employ a wireless communication protocol such as IEEE 802.11, Bluetooth, Bluetooth Low Energy (BLE), or other local area network (LAN) or personal area network (PAN) protocols).

The network interface 34 is shown in phantom, as portions of the interface 34 may be located remotely from the wearable device 110. The network interface 34 may provide for communication between the wearable device 110, audio sources, and/or other networked (e.g., wireless) speaker packages and/or other audio playback devices via one or more communications protocols. The network interface 34 may provide either or both of a wireless interface and a wired interface. The wireless interface may allow the wearable device 110 to communicate wirelessly with other devices in accordance with any communication protocol noted herein. In some particular cases, a wired interface may be used to provide network interface functions via a wired (e.g., Ethernet) connection.

In certain aspects, the network interface 34 may also include one or more network media processor(s) for supporting, e.g., Apple AirPlay® (a proprietary protocol stack/suite developed by Apple Inc., with headquarters in Cupertino, Calif., that allows wireless streaming of audio, video, and photos, together with related metadata between devices) or other known wireless streaming services (e.g., an Internet music service such as: Pandora®, a radio station provided by Pandora Media, Inc. of Oakland, Calif., USA; Spotify®, provided by Spotify USA, Inc., of New York, N.Y., USA); or vTuner®, provided by vTuner.com of New York, N.Y., USA); and network-attached storage (NAS) devices). For example, when a user connects an AirPlay® enabled device, such as an iPhone or iPad device, to the network, the user may then stream music to the network connected audio playback devices via Apple AirPlay®. Notably, the audio playback device can support audio-streaming via AirPlay® and/or DLNA's UPnP protocols, and all integrated within one device. Other digital audio coming from network packets may come straight from the network media processor(s) through (e.g., through a USB bridge) to the control circuit 30. As noted herein, in some cases, the control circuit 30 may include one or more processor(s) and/or microcontroller(s) (simply, "processor(s)" 35), which can include decoders, digital signal processors (DSPs) hardware/software, ARM processor(s) hardware/software, etc. for playing back (rendering) audio content at electroacoustic transducers 28. In some cases, the network interface 34 may also include Bluetooth circuitry for Bluetooth applications (e.g., for wireless communication with a Bluetooth enabled audio source such as a smartphone or tablet). In operation, streamed data can pass from the network interface 34 to the control circuit 30, including the processor(s) or microcontroller(s) (e.g., processor(s) 35). The control circuit 30 may execute instructions (e.g., for performing, among other things, digital signal processing, decoding, and equalization functions), including instructions stored in a corresponding memory (which may be internal to control circuit 30 or accessible via network interface 34 or other network connection (e.g., cloud-based connection). The control circuit 30 may be implemented as a chipset of chips that include separate and multiple analog and digital processors. The control circuit 30 may provide, for example, for coordination of other components of the wearable device 110, such as control of user interfaces (not shown) and applications run by the wearable device 110.

In addition to a processor(s) and/or microcontroller(s), control circuit 30 may also include one or more digital-to-analog (D/A) converters for converting the digital audio signal to an analog audio signal. This audio hardware may also include one or more amplifiers which provide amplified analog audio signals to the electroacoustic transducer(s) 28, which each include a sound-radiating surface for providing an audio output for playback. In addition, the audio hardware may include circuitry for processing analog input signals to provide digital audio signals for sharing with other devices.

The memory in control circuit 30 may include, for example, flash memory and/or non-volatile random access memory (NVRAM). In some implementations, instructions (e.g., software) are stored in an information carrier. The instructions, when executed by one or more processing devices (e.g., the processor(s) or microcontroller(s) in control circuit 30), perform one or more processes, such as those described elsewhere herein. The instructions can also be stored by one or more storage devices, such as one or more (e.g., non-transitory) computer or machine-readable mediums (for example, the memory, or memory on the processor(s)/microcontroller(s)). As described herein, the control circuit 30 (e.g., memory, or memory on the processor(s)/microcontroller(s)) may include a control system including instructions for controlling directional audio selection functions according to various particular implementations. It is understood that portions of the control circuit 30 (e.g., instructions) could also be stored in a remote location or in a distributed location and could be fetched or otherwise obtained by the control circuit 30 (e.g., via any communications protocol described herein) for execution. The instructions may include instructions for controlling device functions based upon detected don/doff events (i.e., the software modules include logic for processing inputs from a sensor system to manage audio functions), as well as digital signal processing and equalization.

The wearable device 110 may also include a sensor system 36 coupled with control circuit 30 for detecting one or more conditions of the environment proximate wearable device 10. The sensor system 36 may include inner sensor(s) 18 and/or outer sensors 24, sensors for detecting inertial conditions at the personal audio device, and/or sensors for detecting conditions of the environment proximate the wearable device 110, as described herein. Sensor system 36 may also include one or more proximity sensors, such as a capacitive proximity sensor or an IR sensor, and/or one or more optical sensors.

The sensors may be on-board the wearable device 110 or may be remote or otherwise wirelessly (or hard-wired) connected to the wearable device 110. As described further herein, sensor system 36 may include a plurality of distinct sensor types for detecting proximity information, inertial information, environmental information, or commands at the wearable device 10. In particular implementations, sensor system 36 may enable detection of user movement, including movement of a user's head or other body part(s). Portions of sensor system 36 may incorporate one or more movement sensors, such as accelerometers, gyroscopes and/or magnetometers and/or a single IMU having three-dimensional (3D) accelerometers, gyroscopes and a magnetometer.

In various implementations, the sensor system 36 can be located at the wearable device 110 (e.g., where a proximity sensor is physically housed in the wearable device 110). In some examples, the sensor system 36 is configured to detect a change in the position of the wearable device 110 relative to the user's head (e.g., detect the device operating state). Data indicating the change in the position of the wearable device 110 may be used to trigger a command function, such as activating an operating mode of the wearable device 110, modifying playback of audio at the wearable device 110 (e.g., by modifying the audio, noise cancellation (e.g., ANC), or transparency of the wearable device), or controlling a power function of the personal audio device 10.

The sensor system 36 may also include one or more interface(s) for receiving commands at the wearable device 110. For example, sensor system 36 may include an interface permitting a user to initiate functions of the wearable device 110. In a particular example implementation, the sensor system 36 may include, or be coupled with, a capacitive touch interface for receiving tactile commands on the wearable device 110.

In other implementations, as illustrated in the phantom depiction in FIG. 2, one or more portions of the sensor system 36 may be located at another device capable of indicating movement and/or inertial information about the user of the wearable device 110. For example, in some cases, the sensor system 36 may include an IMU physically housed in a hand-held device such as a smart device (e.g., smart phone, tablet, etc.) a pointer, or in another wearable audio device. In particular example implementations, at least one of the sensors in the sensor system 36 may be housed in a wearable audio device distinct from the wearable device 110, such as where wearable device 110 includes headphones and an IMU is located in a pair of glasses, a watch, or other wearable electronic device.

In certain aspects, the control circuit 30 is in communication with the inner sensor(s) 18 and receives the two inner signals. Alternatively, the control circuit 30 may be in communication with the outer sensors 24 and receive the two outer signals. In another alternative, the control circuit 30 may be in communication with both the inner sensor(s) 18 and outer sensors 24 and receives the two inner and two outer signals. It should be noted that in some implementations, there may be multiple inner and/or outer microphones in each earpiece 12. As noted herein, the control circuit 30 may include one or more microcontroller(s) or processor(s) having a DSP and the inner signals from the two inner sensor(s) 18 and/or the outer signals from the two outer sensors 24 are converted to digital format by analog to digital converters. In response to the received inner and/or outer signals, the control circuit 30 may take various actions. For example, the power supplied to the wearable device 110 may be reduced upon a determination that one or both earpieces 12 are off-head. In another example, full power may be returned to the wearable device 110 in response to a determination that at least one earpiece becomes on head. Other aspects of the wearable device 110 may be modified or controlled in response to determining that a change in the operating state of the earpiece 12 has occurred. For example, ANR functionality may be enabled or disabled, audio playback may be initiated, paused or resumed, a notification to a wearer may be altered, and a device (e.g., a cellular phone, a handheld device, a wireless device, a laptop computer, a tablet, a smartphone, an Internet of things (IoT) device, a wearable device, an AR device, a VR device, etc.) in communication with the wearable device 110 may be controlled. As illustrated, the control circuit 30 generates a signal that is used to control a power source 32 for the wearable device 110. The control circuit 30 and power source 32 may be in one or both of the earpieces 12 or may be in a separate housing in communication with the earpieces 12.

Example Operations for Speech Enhancement During Audio Signal Processing

Certain aspects of the present disclosure provide techniques, including devices and systems implementing the techniques, for using speech enhancement to provide optimal denoised output. Speech enhancement as described herein may involve dynamically determining a mixed audio signal using a condition of an environment of a device and at least one of a first audio signal (e.g., received at an internal sensor of the device), a second audio signal device (e.g., received at a sensor outside the ear canal of a user of the device), or an MVDR formed using the second audio signal and optionally an additional audio signal received at another sensor outside the ear canal of a user of the device. In certain aspects, the device may modify the audio signal received at the internal sensor using a static AEC and an adaptive AEC before determining the mixed audio signal. In certain aspects, the device may modify the audio signal using an adaptive AEC configured to further remove any far end echoes after the audio mixing. The device may utilize a trained machine-learning model (e.g., denoiser) configured to at least partially denoise the mixed audio signal and produce an optimal denoised output (e.g., for transmission to another device). As a result of utilizing the phase reconstruction described herein, the device may be able to greatly reduce the presence of any wind noise and acoustic noise in the output audio signal while maintaining great user speech legibility and naturalness.

Figure 3:
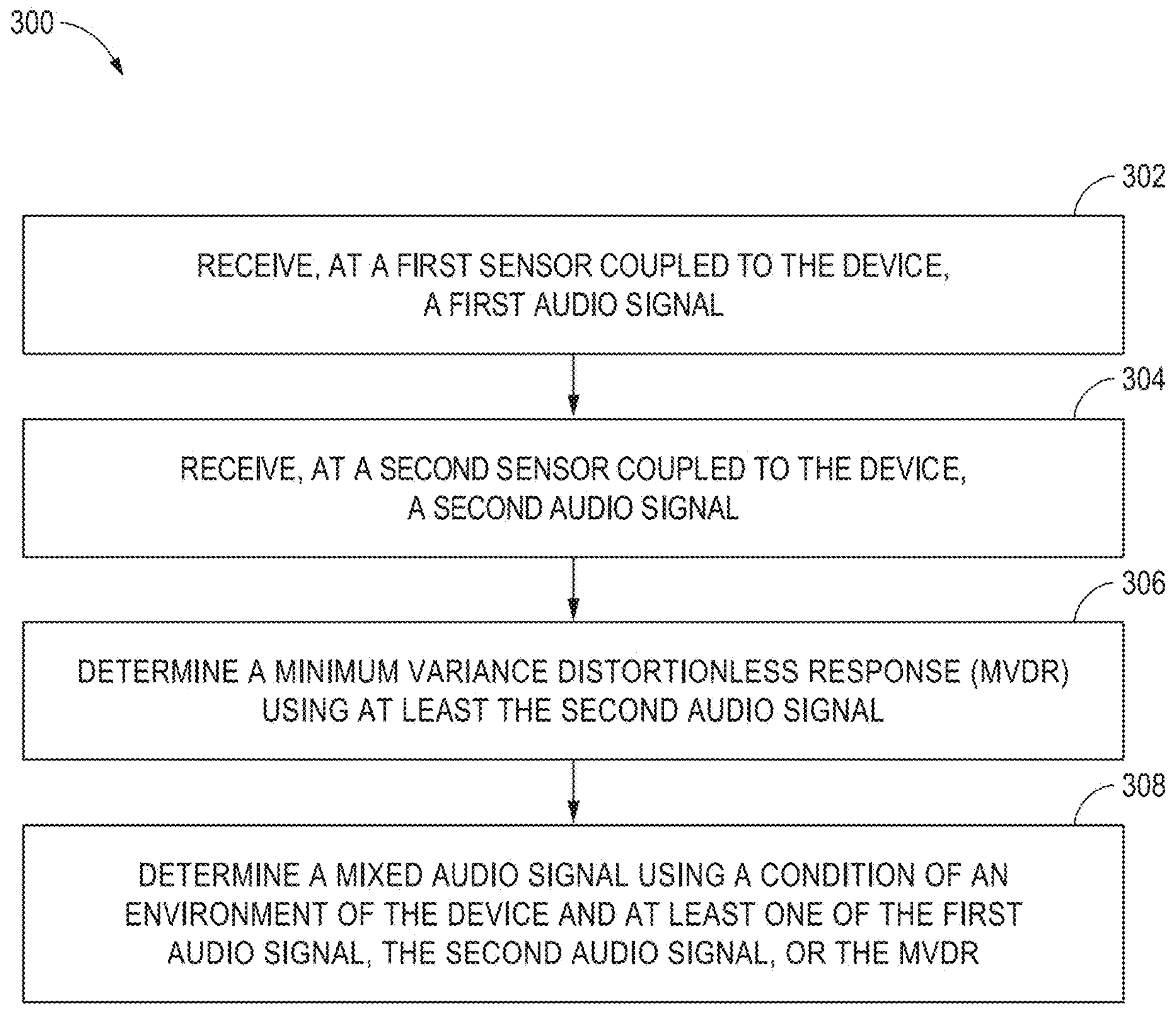
FIG. 3 illustrates example operations for audio signal processing performed by a device, according to certain aspects of the present disclosure.
Figure 4A:
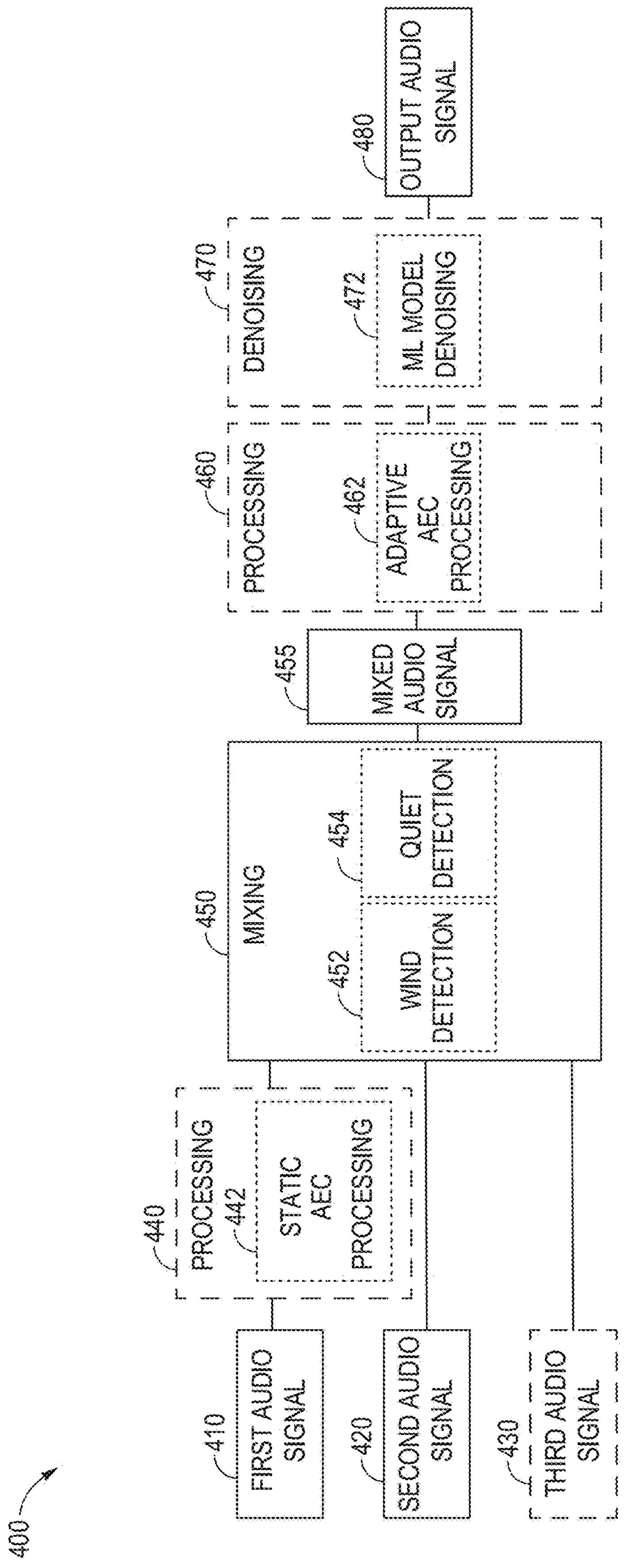
FIG. 4A is a block diagram of an example process flow for speech enhancement during the operations of FIG. 3 for audio signal processing, according to certain aspects of the present disclosure.
Figure 4B:
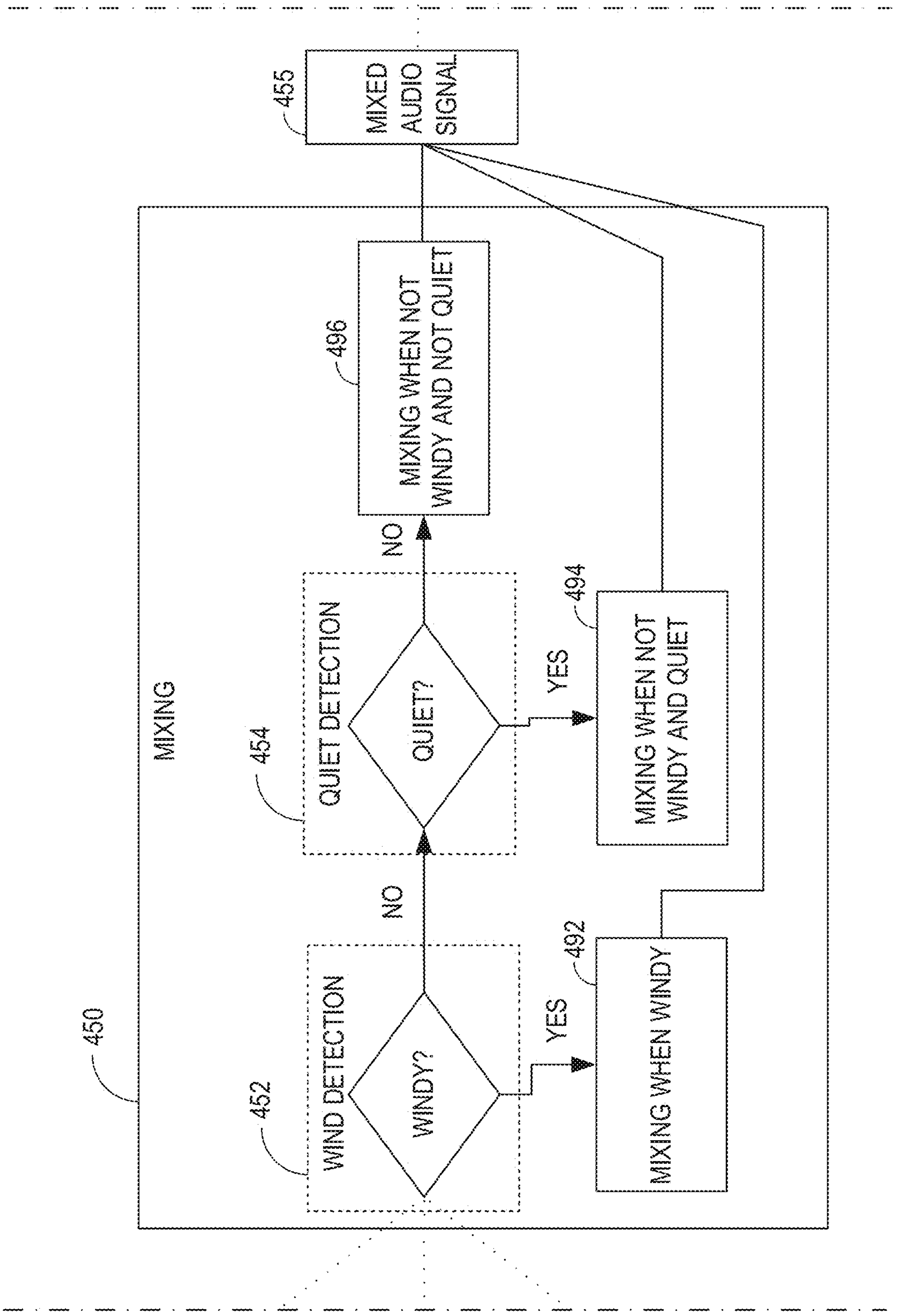
FIG. 4B is a block diagram of a mixing stage of the example process flow of FIG. 4A for speech enhancement, according to certain aspects of the present disclosure.
Figure 5A:
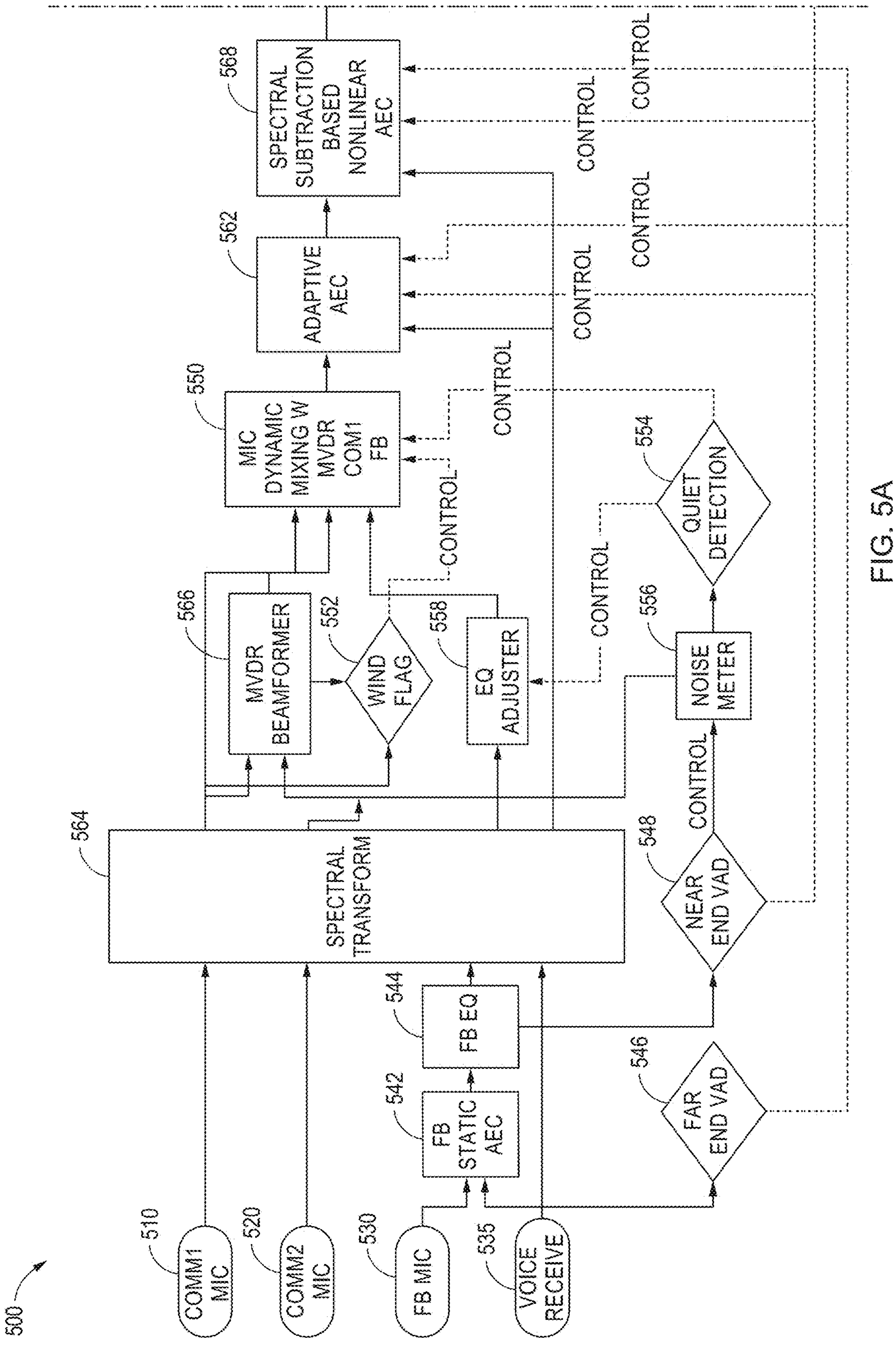
FIGS. 5A and 5B are block diagrams of an example process flow for speech enhancement during the operations of FIG. 3 for audio signal processing, according to certain aspects of the present disclosure.
Figure 5B:
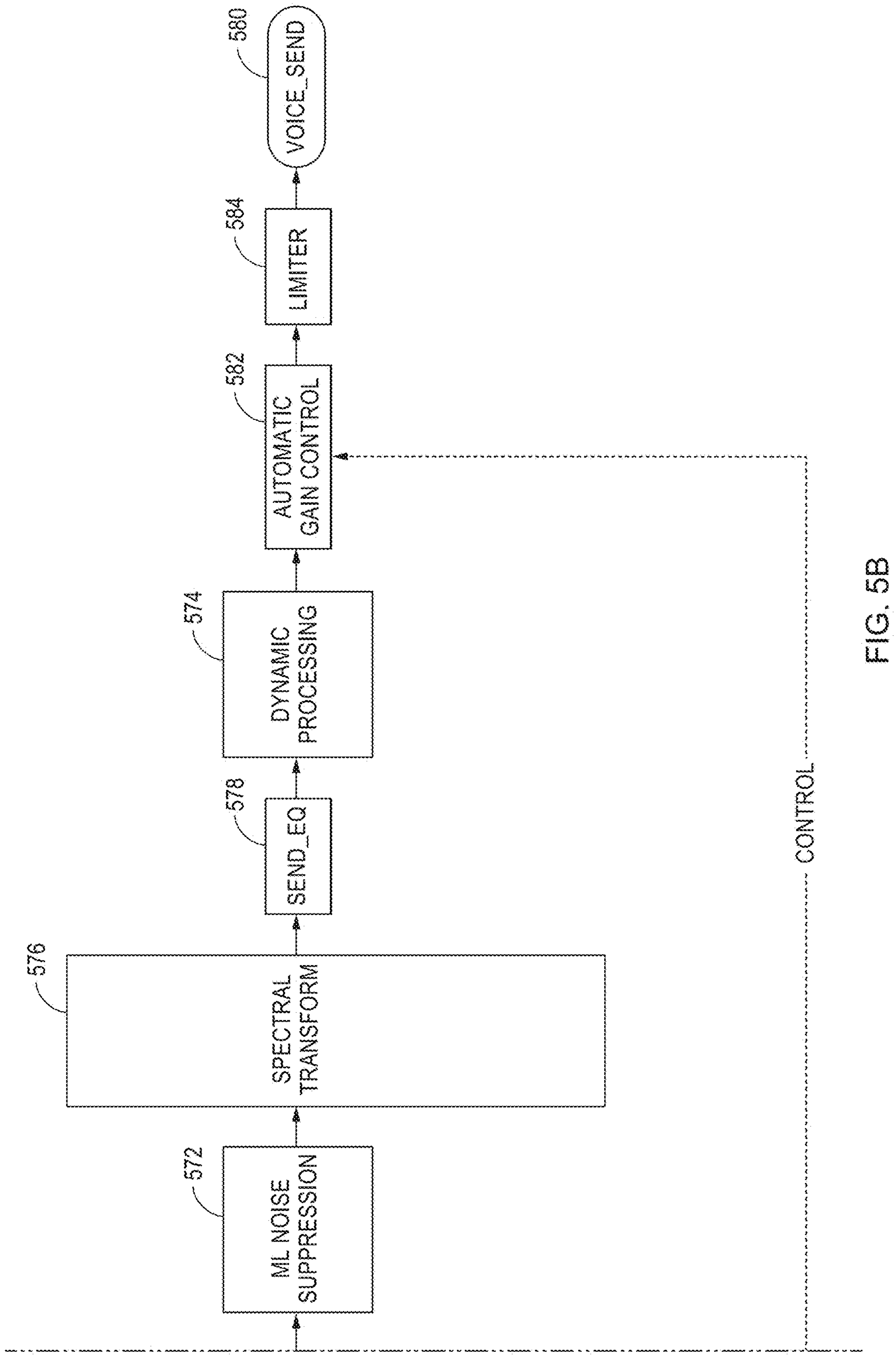

FIG. 3 illustrates example operations 300 for audio signal processing performed by a device (e.g., the wearable device 110 of FIGS. 1 and 2), according to certain aspects of the present disclosure. FIG. 4A is a block diagram of an example process flow 400 for speech enhancement during the operations 300 of FIG. 3 for audio signal processing, according to certain aspects of the present disclosure. FIG. 4B is a block diagram of the mixing 450 of the example process flow 400 of FIG. 4A for speech enhancement, according to certain aspects of the present disclosure. FIGS. 5A and 5B are block diagrams of an example process flow 500 for speech enhancement during the operations of FIG. 3 for audio signal processing, according to certain aspects of the present disclosure. Therefore, FIG. 3, FIGS. 4A and 4B, and FIGS. 5A and 5B are herein described together for clarity. The operations 300 and the process flows 400 and 500 may be performed by a wearable device (e.g., the device 110 of FIG. 1 and FIG. 2), by a control circuit (e.g., control circuit 30) of the device (e.g., using one or more processors, individually or collectively, included in the control circuit). The operations 300 and the process flows 400 and 500 may be utilized by the device continuously, periodically, or selectively.

The operations 300 may include, at block 302, receiving, at a first sensor (e.g., inner sensor(s) 18) coupled to the device, a first audio signal 410. In certain aspects, the first sensor may include or be implemented by an internal sensor. The internal sensor may be implemented by, for example, a bone conduction sensor and/or transducer (e.g., an internal microphone inside an ear canal of a user of the device, an internal microphone facing the ear canal on an around ear device, a voice band accelerometer outside the ear canal, a feedback microphone, or the like).

At block 304, the operations 300 may include receiving, at a second sensor (e.g., outer sensor(s) 24) coupled to the device, a second audio signal 420. In certain aspects, the second sensor may include or be implemented by a microphone outside the ear canal of the user of the device (e.g., implemented and/or referred to herein as an "external microphone," an "outside microphone," or an "out-of-user canal microphone"). The first audio signal 410 and the second audio signal 420 may each include a speech component originating from the user of the device and a non-user speech component. The non-user speech component may include, for example, a far-end speaker and/or sound generated while the device is in an aware mode. In certain aspects, the first audio signal 410 may be clean (e.g., noiseless), or at least cleaner (e.g., less noisy) than the second audio signal 420 (e.g., as a result of the passive isolation and/or active noise cancellation of the first sensor). However, due to the positioning of the first sensor, the first audio signal 410 may include an echo present in the non-user speech component. The echo may be created by far end audio (e.g., audio from a far-end speaker or noise from the environment of far-end speaker produced during two way communication between the device and another device). The first audio signal 410 may also be more band-limited than the second audio signal 420.

At block 306, the operations 300 may include determining a MVDR using at least the second audio signal 420. Determining the MVDR may include, for example, using a MVDR beamformer, as is described below. In certain aspects, the MVDR may be replaced by other array formations, such as, for example, a static microphone array or adaptive microphone array. The adaptive microphone array may utilize, for example, machine learning to form the signal.

At block 308, the operations 300 may include determining a mixed audio signal 455 using a condition of an environment of the device (e.g., using wind detection 452 and/or quiet detection 454) and at least one of the first audio signal 410, the second audio signal 420, or the MVDR. Determining the mixed audio signal 455 may involve performing mixing 450 on at least one of the first audio signal 410, the second audio signal 420, or the MVDR, based on the condition of the environment.

According to certain aspects, the operations 300 may further include receiving, at a third sensor (e.g., outer sensor(s) 24) coupled to the device, a third audio signal 430. In these aspects, determining the MVDR may include using the second audio signal 420 and the third audio signal 430 (e.g., using the MVDR beamformer described below). The third sensor may include or be implemented by another external microphone. The third audio signal 430 may also include the user speech component originating from the user of the device and a non-user speech component.

According to certain aspects, the operations 300 may include determining that the condition of the environment of the device is windy when an energy of the MVDR is greater than an energy of the second audio signal by a wind factor (e.g., by a factor of, for example, 1 dB to 10 dB, such as 3 dB, 6 dB, 10 dB, etc.). When the condition of the environment is windy (e.g., when Windy?=Yes at wind detection 452), the process flow 400 may involve determining the mixed audio signal 455 in accordance with the mixing at block 492 (labeled "Mixing when windy"). In other words, whenever the condition of the environment is windy, the process flow 400 may involve determining the mixed audio signal 455 in accordance with the mixing at block 492, regardless of whether or not the condition of the environment is quiet or not. Determining the mixed audio signal 455 in accordance with the mixing at block 492 may include using the first audio signal 410 and the second audio signal 420 for frequencies below a first frequency threshold (e.g., a threshold between, for example, 500 Hz and 10 kHz, such as 1 kHz, 2 kHz, 4 kHz, etc.) and the MVDR for frequencies above the first frequency threshold.

In certain aspects, determining the mixed audio signal 455 in accordance with the mixing at block 492 may include dynamically mixing a magnitude of the first audio signal 410 and a magnitude of the second audio signal 420 for the frequencies below the first frequency threshold, using a phase of the first audio signal 410 for the frequencies below the first frequency threshold, and using a magnitude and a phase of the MVDR for the frequencies above the first frequency threshold. In this manner, an SNR favored first audio signal 410 (e.g., from the internal sensor voice band accelerometer) may be mixed with a lower SNR second audio signal 420 (e.g., from an outside sensor), which results in an mixed audio signal 455 that resembles an audio signal received at an outside sensor but with an improved SNR (compared to a typical SNR of an audio signal received at an outside sensor). By using the mixed audio signal 455 with the improved SNR, the process flow 400 may enable the device to produce an optimal output audio signal 480 that includes the best combination of wind reduction and voice naturalness for the magnitude mixing below the first frequency threshold while using the phase from the first audio signal 410.

In certain aspects, a ratio of the mixing between the magnitude of the first audio signal 410 and the magnitude of the second audio signal 420 for each frequency bin of the frequencies below the first frequency threshold at block 492 may be based on a ratio between an energy of the first audio signal 410 and the energy of the second audio signal 420. In certain aspects, the ratio of the mixing between the magnitude of the first audio signal 410 and the magnitude of the second audio signal 420 for each frequency bin of the frequencies below the first frequency threshold at block 492 may be inversely proportional to the ratio between the energy of the first audio signal 410 and the energy of the second audio signal 420. In this manner, as the ratio of the energy of the first audio signal 410 to the energy of the second audio signal 420 decreases, the ratio of the magnitude of the first audio signal 410 to the magnitude of the second audio signal 420 for each frequency bin of the frequencies would increase (e.g., resulting in more of the magnitude of the first audio signal 410 and less of the magnitude of the second audio signal 420 being used in the mixed signal 455).

The operations 300 may also include determining that the condition of the environment of the device is not windy when the energy of the MVDR is less than the energy of the second audio signal by the wind factor. When the condition of the environment is not windy (e.g., when Windy?=No at wind detection 452), the process flow 400 may involve determining the mixed audio signal 455 in accordance with the mixing at block 494 (labeled "Mixing when not windy and quiet") when the condition is quiet or block 496 (labeled "Mixing when not windy and not quiet") when the condition is not quiet (e.g., noisy). When the condition of the environment of the device is not windy, the device may determine that the condition is quiet (e.g., when Quiet?=Yes at quiet detection 454) when a level of the noise of the third audio signal 430 is below a tunable noise threshold (e.g., a threshold between, for example, −100 decibels relative to full scale (dBFS) and −10 dBFS, such as −90 dBFS, −80 dBFS, −70 dBFS, etc.). When the condition is quiet, determining the mixed audio signal 455 in accordance with the mixing at block 494 may include using the MVDR for a range of frequencies (e.g., for most or all of the frequencies of the MVDR). When the condition of the environment of the device is not windy, the device may determine that the condition is noisy (e.g., when Quiet?=No at quiet detection 454) when the level of the noise of the third audio signal 430 is above the tunable noise threshold. When the condition is not quiet (e.g., noisy), determining the mixed audio signal 455 in accordance with the mixing at block 496 may include using the MVDR and the first audio signal 410 for frequencies below a second frequency threshold (e.g., a threshold between, for example, 500 Hz and 10 kHz, such as 2 kHz, 3 kHz, 4 kHz, etc.) and the MVDR for frequencies above the second frequency threshold.

In certain aspects, determining the mixed audio signal 455 in accordance with the mixing at block 496 may include dynamically mixing a magnitude of the first audio signal 410 and a magnitude of the MVDR for the frequencies below the second frequency threshold, using a phase of the first audio signal 410 for the frequencies below the second frequency threshold, and using a magnitude and a phase of the MVDR for the frequencies above the second frequency threshold.

In certain aspects, a ratio of the mixing between the magnitude of the first audio signal 410 and the magnitude of the MVDR for each frequency bin of the frequencies below the second frequency threshold is based on a ratio between an energy of the first audio signal 410 and the energy of the MVDR. In certain aspects, the ratio of the mixing between the magnitude of the first audio signal 410 and the magnitude of the MVDR for each frequency bin of the frequencies below the second frequency threshold at block 494 may be inversely proportional to the ratio between the energy of the first audio signal 410 and the energy of the MVDR. In this manner, as the ratio of the energy of the first audio signal 410 to the energy of the MVDR decreases, the ratio of the magnitude of the first audio signal 410 to the magnitude of the MVDR for each frequency bin of the frequencies would increase (e.g., resulting in more of the magnitude of the first audio signal 410 and less of the magnitude of the MVDR being used in the mixed signal 455).

According to certain aspects, the operations 300 may further include modifying the first audio signal 410 using a static AEC, and further modifying the first audio signal 410 using an adaptive AEC. Modifying the first audio signal 410 may involve performing processing 440 on the first audio signal 410. The processing 440 may include static AEC processing 442 using the static AEC. The AEC processing 442 may be configured to remove the echo in the first audio signal 410 that may be created by far end audio, as described above. Further modifying the first audio signal 410 may involve performing processing 460 on the first audio signal 410 (which may in some cases already have been mixed with the second audio signal 420 and/or the third audio signal 430 and thus already be the mixed audio signal 455). The processing 460 may include adaptive AEC processing 462 using the adaptive AEC.

According to certain aspects, the operations 300 may further include determining an output audio signal 480 using the mixed audio signal 455 (e.g., which may include one or some combination of the first audio signal 410, the second audio signal 420, and the MVDR, dependent on the mixing 450 described above, and may resemble an audio signal received at an outside sensor but have an improved SNR) and a trained-machine learning mode (e.g., which may be referred to herein simply as a "denoiser") configured to at least partially denoise the mixed audio signal 455. Determining the output audio signal 480 may involve performing denoising 470 on the mixed audio signal 455 using ML model denoising 472 provided by the denoiser. The denoising and the resultant denoised audio signal provided by the denoiser utilized in the process flow 400 may be improved as a result of the higher SNR of the mixed audio signal 455 (e.g., when compared to a denoiser that uses an audio signal received at one or more outside sensors) input into the denoiser. In this manner, the denoiser may perform well even when the SNR of the second audio signal 420 and/or the third audio signal 430 are very low and/or negative. In addition, using mixed audio signal 455 and the denoiser may allow for greater differentiation between speech from the user or wearer of the device (e.g., the target speaker) and other speakers who may be in the vicinity of the user. The output audio signal 480 resulting from the process flow 400 may be used, for example, during communication with another device.

In some cases, the denoiser may be implemented by a deep learning model. The denoiser may use various machine learning techniques based on artificial neural networks. For example, the denoiser, when implemented as a deep learning model, may include deep learning architectures, such as deep neural networks, deep belief networks, deep reinforcement learning, recurrent neural networks, convolutional neural networks, transformers, and the like.

In the example process flow 500, the first sensor may be implemented by an internal sensor 530 (labeled "FB MIC"), the second sensor may be implemented by a first outside sensor 510 (labeled "COMM1 MIC"), and the third sensor may be implemented by a second outside sensor 520 (labeled "COMM2 MIC"). The internal sensor 530 may be similar to the internal sensor described above, and may be implemented by, for example, a bone conduction sensor and/or transducer (e.g., an internal microphone inside an ear canal of a user of the device, an internal microphone facing the ear canal on an around ear device, a voice band accelerometer outside the ear canal, a feedback microphone, or the like).

In certain aspects, the internal sensor 530 may also be implemented by a voice band accelerometer or the like. The signal received at the internal sensor 530 (e.g., the first audio signal 410) may be processed by a feedback static AEC 542 (labeled "FB STATIC AEC") and a feedback equalizer 544 (labeled "FB EQ"). The feedback static AEC 542 may be configured to remove at least part of the echo in the first audio signal 410 that may be created by far end audio, as described above. The feedback equalizer 544 may be configured to perform a time domain equalization on the first audio signal 410 configured to account for different spectra characteristics that may exist between the first audio signal 410 and the audio signal received at the first outside sensor 510 (e.g., second audio signal 420), and/or the audio signal received at the second outside sensor 520 (e.g., third audio signal 430). In certain aspects, the internal sensor 530 may be used as a self-voice activity detector due to its isolation and shielding from external noise and wind.

The first audio signal 410, second audio signal 420, and the third audio signal 430 may all be transformed into the frequency domain using a spectral transform 564 (labeled "SPECTRAL TRANSFORM"), such as, for example, a weighted overlap add (WOLA) filter bank or a short time Fourier transform (STFT). The second audio signal 420 and the third audio signal 430 may form a MVDR using the MVDR beamformer 566. The MVDR beamformer 566 may be configured to suppress acoustic ambient noise while keeping the user speech component spectra in the second audio signal 420 and the third audio signal 430 intact. An energy of the MVDR resulting from the MVDR beamformer 566 may be compared to an energy of the second audio signal 420, as described above, for wind flag 552 (labeled "WIND FLAG") detection. The first audio signal 410 may go through a frequency domain equalizer tuner 558 (labeled "EQ ADJUSTER") configured to automatically adjust the device user's speech characteristics (e.g., with a multi-frequency gain adjustment) to match the user's second audio signal 420 speech spectra.

The first audio signal 410, the second audio signal 420, and/or the MVDR may be mixed together at the mixing 550 (labeled "MIC DYNAMIC MIXING W MVDR COM1 FB") depending on the condition of the environment of the device, depending on the wind flag 552 (e.g., whether the condition is windy or not), and quiet detection 554. The quiet detection may use a noise meter 556 configured to monitor the third audio signal 430 received at the second outside sensor 520 and estimate the noise in the environment of the device to enable the quiet detection 554 to determine whether the external noise conditions of the device are noisy or not). The noise meter 556 may be configured to monitor the third audio signal 430 received at the second outside sensor 520 (e.g., to inform the quiet detection 554) when the user of the device is not speaking (e.g., when voice receive 535 is not triggered by the internal sensor 530) such that the speaking of the user does not contribute to the noise meter 556 estimation of the noise in the environment of the user. The mixing 550 may be performed in the same manner as the mixing 450 depending on the condition of the environment of the device (e.g., using block 492, block 494, and block 496), which is described above.

The mixed first audio signal 410, the second audio signal 420, and/or the third audio signal 430 (e.g., mixed audio signal 455) may pass through an adaptive linear AEC 562 (labeled "ADAPTIVE AEC") and a spectra subtraction based non-linear adaptive AEC 568 (labeled "SPECTRAL SUBTRACTION BASED NONLINEAR AEC") configured to reduce the remaining echo (e.g., any echo that may have not been removed by the feedback static AEC 542) from the internal sensor 530 and the first outside sensor 510 and the second outside sensor 530. Both the adaptive linear AEC 562 and the spectra subtraction based non-linear adaptive AEC 568 may be controlled by a far end voice activity detector (VAD) 546 (labeled "FAR END VAD") and a near end VAD 548. The adaptive linear AEC 562 may include, for example, a Kalman filter or a normalized least mean square (NLMS) filter.

The output of the spectra subtraction based non-linear adaptive AEC 568 (e.g., the echo cleaned mixed audio signal 455) may go through ML noise suppression 572 (e.g., labeled "ML NOISE SUPRESSION," which may be implemented and/or referred to as a "single channel deep learning based denoiser") performed by the denoiser described above with respect to FIG. 4A. The ML noise suppression 572 may be configured to further clean up any residual wind and noise present in the echo cleaned mixed audio signal 455. The echo cleaned mixed audio signal may then be transformed back to the time domain using a spectral transform 576 (labeled "SPECTRAL TRANSFORM"), such as, for example, a WOLA filter bank or a STFT, and then output to the static equalizer at block 578 (labeled "SEND_EQ"). In certain aspects, dynamic processing 574 (labeled "DYNAMIC PROCESSING,") which may in some cases be implemented as or include dynamic range compression, the automatic gain control at block 582 (labeled "AUTOMATIC GAIN CONTROL"), and/or the wide band limiter at block 584 (labeled "LIMITER"), may be applied to the mixed audio signal 455 after the static equalizer 578 (labeled "SEND_EQ"), to produce the output audio signal 580 (labeled "VOICE_SEND"). The output audio signal 580 resulting from the process flow 500 may be used, for example, during communication with another device.

Although the first audio signal 410, the second audio signal 420, and the third audio signal 430 are all shown in FIGS. 4A, 4B, 5A, and 5B, the process flows 400 and 500 may, in some cases, not include the third audio signal 430. In these cases, the MVDR beamformer 566 may not be included in the process flows 400 and 500, the noise meter 556 may be configured to monitor the second audio signal 420 received at the first outside sensor 510 in order determine whether the external noise conditions of the device is noisy or not, and the MVDR referred to in the process flows 400 and 500 may be replaced by the second audio signal 420.

When the device is implemented as a banded headset with two cups each configured to deliver audio output to an ear of the user of the device, external sensors may be present on both sides of the banded headset (e.g., COMM1 Mic and COMM2 Mic may be present on each side of the banded headset). In these cases, the speech enhancement described herein may involve determining the MVDR for each side of the banded headset and summing the two determined MVDRs to form the MVDR which is used in the process flows 400 and 500 (e.g., for the mixing 450 and the mixing 550).

Although the process flows 400 and 500 are each described herein individually, it is to be understood that aspects of any of the process flows 400 and 500 may be combined and implemented together in a single process flow. The processing blocks may be performed in the order described herein and illustrated in FIGS. 4A, 4B, 5A, and 5B, or in any other order. In certain aspects, additional processing blocks not illustrated herein may also be include in the process flows 400 and 500 to enable the speech enhancement.

Additional Considerations

It is noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware aspect, an entirely software aspect (including firmware, resident software, micro-code, etc.) or an aspect combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples of a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

What is claimed is:

1. A system comprising:
- a device of a user;
- a first sensor coupled to the device;
- a second sensor coupled to the device; and
- one or more processors coupled to the device, the one or more processors, individually or collectively, being configured to:
  - receive, at the first sensor, a first audio signal;
  - receive, at the second sensor, a second audio signal;
  - determine a minimum variance distortionless response (MVDR) using at least the second audio signal;
  - determine a condition of an environment of the device is windy when an energy of the MVDR is greater than an energy of the second audio signal by a wind factor;
  - determine that the condition of the environment of the device is not windy when the energy of the MVDR is less than the energy of the second audio signal by the wind factor; and
  - determine a mixed audio signal using the condition of the environment of the device and at least one of the first audio signal, the second audio signal, or the MVDR.

2. The system of claim 1, wherein the one or more processors, individually or collectively, are further configured to:
- determine an output audio signal using the mixed audio signal and a trained machine-learning model configured to at least partially denoise the mixed audio signal.

3. The system of claim 1, wherein the one or more processors, individually or collectively, are further configured to:
- modify the first audio signal using a static acoustic echo canceller (AEC); and
- further modify the first audio signal using an adaptive AEC.

4. The system of claim 1, wherein the one or more processors, individually or collectively, are further configured to:
- receive, at a third sensor coupled to the device, a third audio signal, and wherein determining the MVDR comprises using the second audio signal and the third audio signal.

5. The system of claim 4, wherein
- determining the mixed audio signal when the condition is windy comprises using the first audio signal and the second audio signal for frequencies below a first frequency threshold and the MVDR for frequencies above the first frequency threshold.

6. The system of claim 5, wherein the one or more processors, individually or collectively, are further configured to:
- when the condition of the environment of the device is not windy, determining that the condition is quiet when a level of a noise of the third audio signal is below a tunable noise threshold, wherein when the condition is quiet, determining the mixed audio signal using the MVDR for a range of frequencies; and
- when the condition of the environment of the device is not windy, determining that the condition is noisy when the level of the noise of the third audio signal is above the tunable noise threshold, wherein when the condition is noisy, determining the mixed audio signal using the MVDR and the first audio signal for frequencies below a second frequency threshold and the MVDR for frequencies above the second frequency threshold.

7. A method for audio signal processing in a device, the method comprising:
- receiving, at a first sensor coupled to the device, a first audio signal;
- receiving, at a second sensor coupled to the device, a second audio signal;
- determining a minimum variance distortionless response (MVDR) using at least the second audio signal;
- determining that a condition of an environment of the device is windy when an energy of the MVDR is greater than an energy of the second audio signal by a wind factor;
- determining that the condition of the environment of the device is not windy when the energy of the MVDR is less than the energy of the second audio signal by the wind factor; and determining a mixed audio signal using the condition of the environment of the device and at least one of the first audio signal, the second audio signal, or the MVDR.

8. The method of claim 7, further comprising:

determining an output audio signal using the mixed audio signal and a trained machine-learning model configured to at least partially denoise the mixed audio signal.

9. The method of claim 7, further comprising:

modifying the first audio signal using a static acoustic echo canceller (AEC); and further modifying the first audio signal using an adaptive AEC.

10. The method of claim 7, further comprising:

receiving, at a third sensor coupled to the device, a third audio signal, and wherein determining the MVDR comprises using the second audio signal and the third audio signal.

11. The method of claim 10, wherein determining the mixed audio signal when the condition is windy comprises using the first audio signal and the second audio signal for frequencies below a first frequency threshold and the MVDR for frequencies above the first frequency threshold.

12. The method of claim 11, further comprising:

when the condition of the environment of the device is not windy, determining that the condition is quiet when a level of a noise of the third audio signal is below a tunable noise threshold, wherein when the condition is quiet, determining the mixed audio signal using the MVDR for a range of frequencies; and when the condition of the environment of the device is not windy, determining that the condition is noisy when the level of the noise of the third audio signal is above the tunable noise threshold, wherein when the condition is noisy, determining the mixed audio signal using the MVDR and the first audio signal for frequencies below a second frequency threshold and the MVDR for frequencies above the second frequency threshold.

13. The method of claim 11, wherein determining the mixed audio signal when the condition is windy comprises:

dynamically mixing a magnitude of the first audio signal and a magnitude of the second audio signal for the frequencies below the first frequency threshold, wherein a ratio of the mixing between the magnitude of the first audio signal and the magnitude of the second audio signal for each frequency bin of the frequencies below the first frequency threshold is based on a ratio between an energy of the first audio signal and the energy of the second audio signal;

using a phase of the first audio signal for the frequencies below the first frequency threshold; and using a magnitude and a phase of the MVDR for the frequencies above the first frequency threshold.

14. The method of claim 12, wherein determining the mixed audio signal when the condition is noisy comprises:

dynamically mixing a magnitude of the first audio signal and a magnitude of the MVDR for the frequencies below the second frequency threshold, wherein a ratio of the mixing between the magnitude of the first audio signal and the magnitude of the MVDR for each frequency bin of the frequencies below the second frequency threshold is based on a ratio between an energy of the first audio signal and the energy of the MVDR;

using a phase of the first audio signal for the frequencies below the second frequency threshold; and using a magnitude and a phase of the MVDR for the frequencies above the second frequency threshold.

15. The method of claim 10, wherein:

the first sensor comprises an internal microphone inside or facing an ear canal of a user of the device or a voice band accelerometer outside the ear canal;

the second sensor comprises a first microphone outside the ear canal; and the third sensor comprises a second microphone outside the ear canal.

16. The method of claim 7, wherein the device comprises a wearable device.

17. A non-transitory computer-readable medium comprising computer-executable instructions that, when executed by one or more processors of a device, cause the device to perform a method for audio signal processing, the method comprising:

receiving, at a first sensor coupled to the device, a first audio signal;

receiving, at a second sensor coupled to the device, a second audio signal;

determining a minimum variance distortionless response (MVDR) using at least the second audio signal; and determining that a condition of an environment of the device is windy when an energy of the MVDR is greater than an energy of the second audio signal by a wind factor;

determining that the condition of the environment of the device is not windy when the energy of the MVDR is less than the energy of the second audio signal by the wind factor;

determining a mixed audio signal using the condition of the environment of the device and at least one of the first audio signal, the second audio signal, or the MVDR.

18. The non-transitory computer-readable medium of claim 17, wherein the method further comprises:

determining an output audio signal using the mixed audio signal and a trained machine-learning model configured to at least partially denoise the mixed audio signal.

19. The non-transitory computer-readable medium of claim 17, wherein the method further comprises:

modifying the first audio signal using a static acoustic echo canceller (AEC); and further modifying the first audio signal using an adaptive AEC.

20. The non-transitory computer-readable medium of claim 17, wherein the method further comprises:

receiving, at a third sensor coupled to the device, a third audio signal, and wherein determining the MVDR comprises using the second audio signal and the third audio signal.

* * * * *